Sept. 22, 1959 C. C. FISHER 2,904,970
REFRIGERATOR DRIP WATER DISPOSAL MEANS
Filed June 20, 1956

INVENTOR.
CHESTER C. FISHER
BY
*Edward P. Ridder*
ATTORNEY

United States Patent Office 2,904,970
Patented Sept. 22, 1959

2,904,970

REFRIGERATOR DRIP WATER DISPOSAL MEANS

Chester C. Fisher, Los Angeles, Calif.

Application June 20, 1956, Serial No. 592,668

8 Claims. (Cl. 62—188)

This invention relates to means for disposing of the drip water from the evaporator unit of a refrigerator and particularly to means for automatically disposing of this drip water without the use of an external drainage system.

In a refrigerator, particularly the commercial variety utilized in stores and commercial establishments, it is desired to continuously maintain the temperature of the air in the cooling chamber considerably below the temperature of the outside atmosphere. Due to the continuous or periodic removal or replacement of goods stored in the cooling chamber by customers or employees, there is a substantial circulation of air into and out of the cooling chamber. Usually the air in the outside atmosphere has a relative humidity which is quite high. When this air is circulated into the cooling chamber and cooled to the desired temperature, substantial dehydration takes place. The moisture which is thereby removed from the cooled air usually condenses on the evaporator unit of the refrigerator cooling system. If the temperature of this evaporating unit is maintained above the freezing point of water, 32° F., the condensate drips from the coils of the evaporator unit into an appropriate container positioned directly beneath the coils. If the temperature of the evaporating unit is maintained below the freezing point of water, the condensed moisture forms a frost on the evaporator coils. Since this frost is a poor conductor of heat, it must be periodically removed by heating the evaporator coils above the freezing point of water. The frost then melts and drips from the coils into the container positioned below the coils. In either case, it is necessary to provide some means for disposing of this drip water which accumulates in the container below the coils.

In the past this drip water from the evaporator units of commercial refrigerators was usually connected to an external drainage system which disposed of the water by gravity flow into the sewerage system. Since refrigerator units are seldom located near the ordinary drains of commercial establishments, an excessive amount of plumbing was necessary each time a new refrigerator was installed or an old one moved to a new location in the establishment.

It is therefore an object of this invention to provide a refrigerator drip water disposal means which automatically and continuously disposes of the water removed from the air and condensed on the evaporator unit coils of the refrigerator.

It is another object of this invention to provide an improved drip water disposal means for refrigerators.

It is a further object of this invention to provide a drip water disposal means for refrigerators which includes a container positioned external of the cooling chamber of the refrigerator and connected to accumulate the drip water from the evaporator units of the refrigerator; means for continuously circulating air at room temperature over the drip water in said container at a preselected rate of flow; and means responsive to the level of the drip water in the container for energizing a heater coil positioned in the container to accelerate the evaporation of drip water in the container.

Other objects of this invention will become apparent from the following description taken in conjunction with the accompanying drawings in which.

Figure 1:
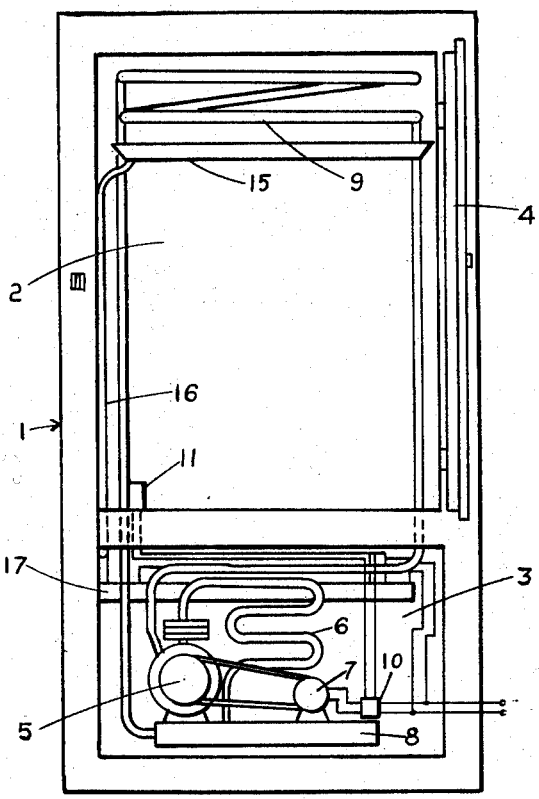
Fig. 1 is a view of a conventional refrigerator unit utilizing the drip water disposal means contemplated by this invention.

Referring now to Fig. 1 there is shown a view, partly schematic, of a typical refrigerator unit utilizing a preferred embodiment of the drip water disposal means contemplated by this invention. Refrigerator 1 includes cooling chamber 2 and machine compartment 3. The food or material to be refrigerated is placed in cooling chamber 2 which is provided with door 4 for easy access. The refrigerator system shown is a conventional compressor type system utilizing compressor 5 for compressing the refrigerant, condenser 6 for liquifying the compressed refrigerant, motor 7 for driving compressor 5, storage container 8 for the liquified refrigerant, evaporator or cooling unit 9 for cooling the air in cooling chamber 2 utilizing the evaporation of the refrigerant as a means for absorbing heat energy in the air, and the associated piping and wiring. The design and construction of such compressors, condensers, storage containers, and evaporator units is well known to those skilled in the art and need not be further described here.

The refrigeration system thereby transfers heat energy from cooling chamber 2 to condenser 6 where this energy is dissipated into the atmosphere. Motor 7 is preferably a conventional constant speed motor which is energized from a source (not shown) of electrical energy through relay 10. Relay 10 is energized to close the circuit between the source of electrical energy and motor 7 whenever the temperature of cooling chamber 2 exceeds a preselected amount as determined by the setting of thermostat 11. Relay 10, thermostat 11, and motor 7 are conventional components well known to those skilled in the art and need not be further described here.

As the air in cooling chamber 2 is lowered in temperature, the excess moisture in the air condenses on the coldest substance in chamber 2. Since evaporator coils 9 are the coldest substance in chamber 2, substantially all of the condensing moisture condenses onto the coils. If the temperature of coils 9 is lower than the freezing point of water, 32° F., the condensate immediately freezes forming a coating of frost on coils 9. As previously pointed out, this frost is a poor conductor of heat and therefore must be periodically removed. The removal of the coating of frost is usually accomplished, either automatically or manually, by disconnecting motor 7 from the source of electrical energy. As a result, coils 9 gradually become warmer until they exceed the melting point of water. The coating of frost thereupon melts and drops into pan 15 positioned directly beneath coils 9. The drip water in pan 15 flows out of the pan through tube 16 into drip water evaporator 17.

Figure 3:
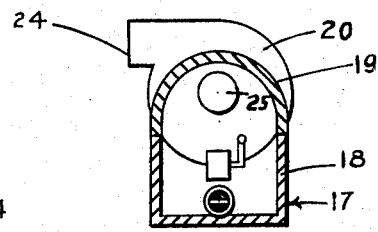
Fig. 3 is a sectioned view of the evaporator of Fig. 2 taken along the line 3—3.
Figure 5:
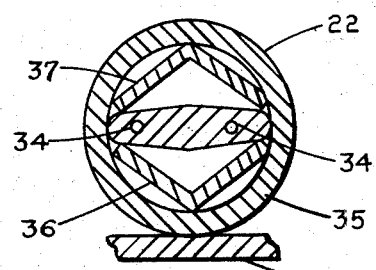
Fig. 5 is a sectioned view of the heater element of the evaporator of Fig. 2 taken along the line 5—5.
Figure 2:
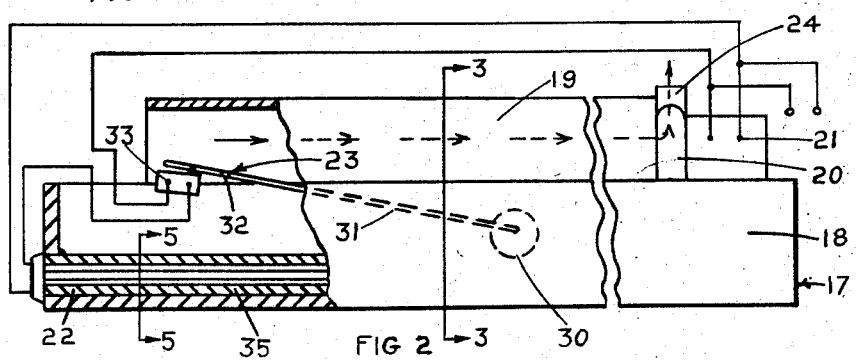
Fig. 2 is a view, partly in section, of a preferred embodiment of the drip water evaporator utilized in the drip water disposal means contemplated by this invention.

Referring now to Figs. 2 and 3 views of drip water evaporator 17 are shown. Evaporator 17 includes elongated pan 18 adapted to hold water, hood 19 fitted on top of pan 18 along a preselected portion of its length, blower 20 with associated motor 21, heater element 22, heater element actuator 23 and the associated wires and tubing. As the drip water is conveyed into pan 18 by means of tube 16, it settles along the bottom of the pan. As shown in the schematic drawing of Fig. 4, motor 21 is continuously subjected to electrical energy from a source thereof (not shown) and therefore continuously rotates blower fan 20. Blower 20 is preferably a centrifugal type of blower having inlet port 25 in the center and outlet port 24 at the periphery of the blower. A continuous stream of air at atmospheric temperature and pressure is thereby drawn across the surface of the drip water in pan 18. Assuming that the humidity of the atmospheric air is considerably less than saturated, that evaporator 9 is maintained slightly above the freezing point of water, and that the door of cooling chamber 2 is not opened very often, this continuous passage of air over the surface of the drip water is sufficient to evaporate enough drip water to maintain the level of the water fairly low.

Figure 4:
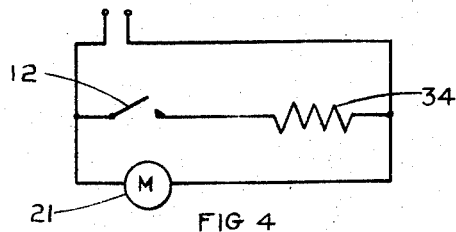
Fig. 4 is a schematic drawing of the electrical circuits utilized in the evaporator of Fig. 2.

If, however, the formation of the drip water exceeds the normal disposal rate obtained by the use of blower 20 alone, heater element 22 is automatically energized and the rate of dissipation of the drip water in pan 18 is increased considerably. The energization of heater element 22 is accomplished by utilizing heater element actuator 23 to sense the level of the drip water in pan 18. Actuator 23 consists of float 30, made of cork or other buoyant material, lever arm 31 having float 30 attached at one end and pivoted about stud 32, and microswitch 33 attached to pan 18 and positioned to be actuated by the other end of lever arm 31 when the drip water rises to a preselected level in pan 18, as evidenced by the rise of float 30. Microswitch 33 is connected in series with the heater element coil 34 in the manner indicated in Fig. 4. In Fig. 4, contact 12 of microswitch 33 is shown in the open or unactuated position. When float 30 rises to the preselected level in pan 18, microswitch 33 closes contact 12 thereby connecting heater coil 34 across the source of electrical energy.

When heater element coil 34 is energized, it produces a large amount of heat energy which is transmitted through sealed tube 35 to the drip water in pan 18. Brass angles 36 and 37 are inserted in tube 35 between heater element coil 34 and the wall of tube 35 to increase the rate of heat transfer from the heater to the wall. As the temperature of the drip water in pan 18 rises, an increased amount of water per unit time is evaporated and carried away through blower 20. The rate of removal of drip water from pan 18 when heater element coil 34 is energized exceeds any possible rate of formation of drip water by condensation on evaporator coils 9. Therefore, the amount of drip water in pan 18 gradually decreases until float 30 reaches a second preselected point considerably below that required for actuation of microswitch 33. At this second level, microswitch 33 opens contact 12 and deenergizing heater element coil 34.

Microswitches which are actuated in one position and released in a different position are well-known to those skilled in the art and are commercially available from many sources. It is to be noted that the position or level of actuation of microswitch 33 can readily be varied by moving microswitch 33 in a vertical direction relative to the adjacent portion of lever arm 31. The magnitude of the change in level of the drip water in pan 18 which corresponds to the actuation and release of the contact of microswitch 33 can also be varied by moving microswitch 33 horizontally in a direction parallel to lever arm 31. Therefore, the actuation and release of microswitch 33 and the corresponding energization and deenergization of heater element coil 34 can be regulated over wide ranges depending on the particular circumstances of any installation. The actuator can be made to actuate only after the drip water has risen to a fairly high level and thus be made insensitive to temporary excess amounts of drip water. Further, once actuated, microswitch 33 continues to connect heater element coil 34 to the source of electrical energy until the drip water has fallen to some preselected value. This eliminates intermittent operation of the heater element during periods when the accumulation of drip water in pan 18 only slightly exceeds the magnitude of dissipation caused by the use of blower 20 alone.

To summarize, the drip water disposal system of this invention continuously disposes of the accumulation of drip water from the normal low-level operation of the refrigerating unit by utilizing a blower in conjunction with a hood to continuously evaporate the drip water as it is accumulated in the disposal pan. Slight temporary overloads caused by excessive use of the refrigerator unit for short periods of time are absorbed by the system and disposed of by the blower alone. A large overload, such as would be caused by defrosting the evaporator coils of a below freezing refrigerator unit or by excessive and prolonged opening and closing of the access door, result in the automatic energization of a heating element in the disposal pan which heats the drip water in the pan thereby accelerating the evaporation of the drip water and the disposal of the same by utilizing the blower.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a refrigerating apparatus having a compartment to be cooled, and a cooling element positioned to cool said compartment, a drip water disposal means comprising a container having an opening to the atmosphere; means for conveying drip water from said cooling element to said container; continuously operating blower means positioned to direct air from the atmosphere across the surface of said drip water in said container; an electric heating element positioned near the bottom of said container; switching means having actuated and released conditions and electrically connected to said heating element in a manner to energize said heating element when in an actuated condition and to deenergize said heating element when in a released condition; a lever; and float means attached to one end of said lever, said switching means, lever and float means being positioned in said container in a manner to actuate said switching means when the drip water in said container accumulates to a first preselected level and to release said switching means when said drip water in said container drops to a second preselected level materially spaced from said first preselected level.

2. In a refrigerator apparatus having a compartment to be kept cool and cooling means for cooling said compartment, said cooling means being adapted to condense moisture from the air in said compartment, a drip water disposal means comprising a container having an opening to the atmosphere; means for conveying said condensed moisture from said cooling means to said container; a blower positioned to continuously circulate air from the atmosphere over the surface of the moisture in said container; an electric heating element positioned in said container; and switching means responsive to changes in the level of the moisture in said container and connected to said heating element in a manner to energize said heating element when the moisture in said container accumulates to a first preselected level and deenergize said heating element when the moisture in said container drops below a second preselected level materially spaced from said first preselected level.

3. A refrigerator having a compartment to be kept cool; a cooling means for cooling said compartment, said cooling means being adapted to condense moisture from the air in said compartment; an accumulator positioned outside of said compartment and open to the atmosphere; means for conveying the moisture condensed on said cooling means to said accumulator; an electric heating element positioned in said accumulator; switching means responsive to changes in the level of the moisture in said accumulator and connected to said heating element in a manner to energize said heating element when the moisture in said accumulator accumulates to a first preselected level and to deenergize said heating element when the moisture in said accumulator drops to a second preselected level materially spaced from said first preselected level; and blower means positioned to continuously direct atmospheric air over the surface of the moisture in said accumulator.

4. In a refrigerator apparatus having a compartment to be kept cool and cooling means for cooling said compartment, drip water disposal means comprising a pan positioned below said cooling means in said compartment; a container open to the atmosphere positioned outside of said compartment; means for conveying the drip water from said pan to said container; continuously operated blower means positioned to direct air from the atmosphere across the surface of the drip water in said container; an electric heating element positioned in said container in a manner to heat the drip water in said container when energized; switching means including a microswitch having a contact with opened and closed positions, a lever, and a float, said microswitch, lever and float being positioned relative to said container in a manner to close said contact when the drip water level rises in said container to a first preselected level and to open said contact when the drip water level in said container falls to a second preselected level materially spaced from said first preselected level; and means electrically connecting said heating element in series with said contact of said microswitch.

5. In a refrigerator apparatus having a compartment to be kept cool and cooling means for cooling said compartment, drip water disposal means comprising a container open to the atmosphere positioned outside of said compartment; means for conveying the drip water from said cooling means to said container; means including a blower and air directing means for continuously directing air from the atmosphere across the surface of the drip water in said container; an electric heating element positioned in said container in a manner to heat the drip water in said container when energized; switching means including a microswitch having a contact with opened and closed positions, a lever, and float, said microswitch, lever and float being positioned relative to said container in a manner to close said contact of said microswitch when the drip water level in said container rises to a first preselected level and to open said contact of said microswitch when the drip water level in said container drops to a second preselected level materially spaced from said first preselected level; and means electrically connecting said heating element to said contact of said microswitch in a manner to energize said heating element when said contact is in the closed position.

6. A drip water disposal means as recited in claim 5 and further comprising means for adjusting the relative positions of said microswitch and said lever in a manner to vary the water levels at which said contact of said microswitch opens and closes.

7. A drip water disposal means as recited in claim 5 in which said electric heating element includes a sealed metallic tube positioned adjacent to the bottom of said container, electric resistance wire positioned within said tube and means for conveying heat from said resistance wire to said tube.

8. In a refrigerator apparatus having a compartment to be kept cool and cooling means for cooling said compartment, drip water disposal means comprising a container open to the atmosphere positioned outside of said compartment; means for conveying the drip water from said cooling means to said container; means including a blower and air directing means for directing air from the atmosphere continuously across the surface of the drip water in said container; an electric heating element including a water tight metallic tube positioned adjacent to the bottom of said container, electric resistance wire positioned within said tube and means for conveying heat from said resistance wire to said tube; switching means including a microswitch having a contact having open and closed positions, a lever, and float, said microswitch, lever and float being positioned relative to said container and to each other in a manner to close said contact of said microswitch when the drip water level in said container rises to a first preselected level and to open said contact of said microswitch when the drip water level in said container drops to a second preselected level materially spaced from said first preselected level, and means for adjusting the relative positions of said microswitch, lever and float in a manner to vary the preselected water levels at which said contact of said microswitch opens and closes; and means electrically connecting said resistance wire in said heating element in series with said contact of said microswitch.

References Cited in the file of this patent
UNITED STATES PATENTS

| | | |
|---|---|---|
| 2,031,550 | Smilack | Feb. 18, 1936 |
| 2,236,359 | Armstrong | Mar. 25, 1941 |